United States Patent
Yoshiyama et al.

(10) Patent No.: US 8,506,683 B2
(45) Date of Patent: Aug. 13, 2013

(54) ABSORBENT LIQUID, AND APPARATUS AND METHOD FOR REMOVING $CO_2$ OR $H_2S$ FROM GAS WITH USE OF ABSORBENT LIQUID

(75) Inventors: Ryuji Yoshiyama, Nagasaki (JP); Masazumi Tanoura, Kanagawa (JP); Noriko Watari, Kanagawa (JP); Shuuji Fujii, Kanagawa (JP); Yukihiko Inoue, Kanagawa (JP); Mitsuru Sakano, Kanagawa (JP); Tarou Ichihara, Nagasaki (JP); Masaki Iijima, Hiroshima (JP); Tomio Mimura, Osaka (JP); Yasuyuki Yagi, Osaka (JP); Kouki Ogura, Osaka (JP)

(73) Assignees: Mitsubishi Heavy Industries, Ltd., Tokyo (JP); The Kansai Electric Power Co., Inc., Osaka (JP)

(*) Notice: Subject to any disclaimer, the term of this patent is extended or adjusted under 35 U.S.C. 154(b) by 0 days.

(21) Appl. No.: 12/729,041

(22) Filed: Jun. 11, 2010

(65) Prior Publication Data
US 2010/0282081 A1 Nov. 11, 2010

Related U.S. Application Data

(62) Division of application No. 12/308,086, filed as application No. PCT/JP2006/311769 on Jun. 12, 2006, now Pat. No. 8,231,719.

(30) Foreign Application Priority Data

Jun. 6, 2006 (JP) .................................. 2006-157584

(51) Int. Cl.
*B01D 53/14* (2006.01)
(52) U.S. Cl.
USPC .................. 95/181; 95/183; 95/235; 95/236; 96/234; 423/228; 252/60
(58) Field of Classification Search
USPC ....... 95/149–240; 423/210–248; 252/60–62, 252/184, 190; 96/234–371; 242/184; 548/579; 546/184–248; 540/612
See application file for complete search history.

(56) References Cited

U.S. PATENT DOCUMENTS 4,100,257 A * 7/1978 Sartori et al. .................. 423/226
4,217,237 A * 8/1980 Sartori et al. .................. 252/192

(Continued)

FOREIGN PATENT DOCUMENTS

CA 2 643 667 9/2007
CA 2 651 888 11/2007

(Continued)

OTHER PUBLICATIONS

Notice of Allowance for corresponding CA Patent Application No. 2,657,993 dated Apr. 27, 2012.

(Continued)

*Primary Examiner* — Duane Smith
*Assistant Examiner* — Thomas McKenzie
(74) *Attorney, Agent, or Firm* — Birch, Stewart, Kolasch & Birch, LLP

(57) ABSTRACT

An absorbent liquid according to the present invention is an absorbent liquid for absorbing $CO_2$ or $H_2S$ or both from gas, in which the absorbent liquid includes an alkanolamine as a first compound component, and a second component including a nitrogen-containing compound having in a molecule thereof two members or more selected from a primary nitrogen, a secondary nitrogen, and a tertiary nitrogen or a nitrogen-containing compound having in a molecule thereof all of primary, secondary, and tertiary nitrogens. The absorbent liquid has an excellent absorption capacity performance and an excellent absorption reaction heat performance, as compared to an aqueous solution containing solely an alkanolamine and a nitrogen-containing compound in the same concentration in terms of wt %, and can recover $CO_2$ or $H_2S$ or both from gas with smaller energy.

4 Claims, 1 Drawing Sheet

(56) References Cited

U.S. PATENT DOCUMENTS

| | | | |
|---|---|---|---|
| 4,336,233 A | | 6/1982 | Appl et al. |
| 5,209,914 A | | 5/1993 | Peytavy et al. |
| 5,277,885 A | | 1/1994 | Peytavy et al. |
| 5,348,714 A | * | 9/1994 | Peytavy et al. ............... 423/228 |
| 5,366,709 A | | 11/1994 | Peytavy et al. |
| 5,462,721 A | | 10/1995 | Pounds et al. |
| 5,700,437 A | | 12/1997 | Fujii et al. |
| 5,904,908 A | * | 5/1999 | Suzuki et al. ................ 423/228 |
| 6,036,931 A | * | 3/2000 | Yoshida et al. .............. 423/228 |
| 6,051,161 A | | 4/2000 | Suzuki et al. |
| 6,436,174 B1 | * | 8/2002 | Grossmann et al. ............ 95/191 |
| 2002/0081256 A1 | * | 6/2002 | Chakravarti et al. .......... 423/228 |
| 2004/0221578 A1 | * | 11/2004 | Iijima et al. .................... 60/649 |
| 2004/0226441 A1 | | 11/2004 | Palmer |
| 2005/0202967 A1 | | 9/2005 | Hoefer et al. |
| 2006/0104877 A1 | * | 5/2006 | Cadours et al. ............... 423/226 |
| 2006/0138384 A1 | | 6/2006 | Grossman et al. |

FOREIGN PATENT DOCUMENTS

| | | |
|---|---|---|
| GB | 2 336 597 A | 10/1999 |
| JP | 61-19286 A | 1/1986 |
| JP | 1-231921 A | 9/1989 |
| JP | 2-504367 A | 12/1990 |
| JP | 6-343858 A | 12/1994 |
| JP | 7-100334 A | 4/1995 |
| JP | 7-246314 A | 9/1995 |
| JP | 2871335 B2 | 1/1999 |
| JP | 3197183 B2 | 6/2001 |
| JP | 2005-254233 A | 9/2005 |
| JP | 2005-296897 A | 10/2005 |
| KR | 2005-0017749 A | 2/2005 |
| RU | 2 227 060 C2 | 4/2004 |
| WO | WO 02/09849 A2 | 2/2002 |
| WO | WO 2004/071624 A1 | 8/2004 |

OTHER PUBLICATIONS

Notice of Allowance dated Apr. 2, 2012 in U.S. Appl. No. 12/308,086.
English language Translation and Decision of Patent Granted dated Jun. 19, 2012 for corresponding application No. 2004-360528.
Notice of Allowance dated Feb. 19, 2013 for corresponding JP Patent Application No. 2006-157584 with partial Translation.

* cited by examiner

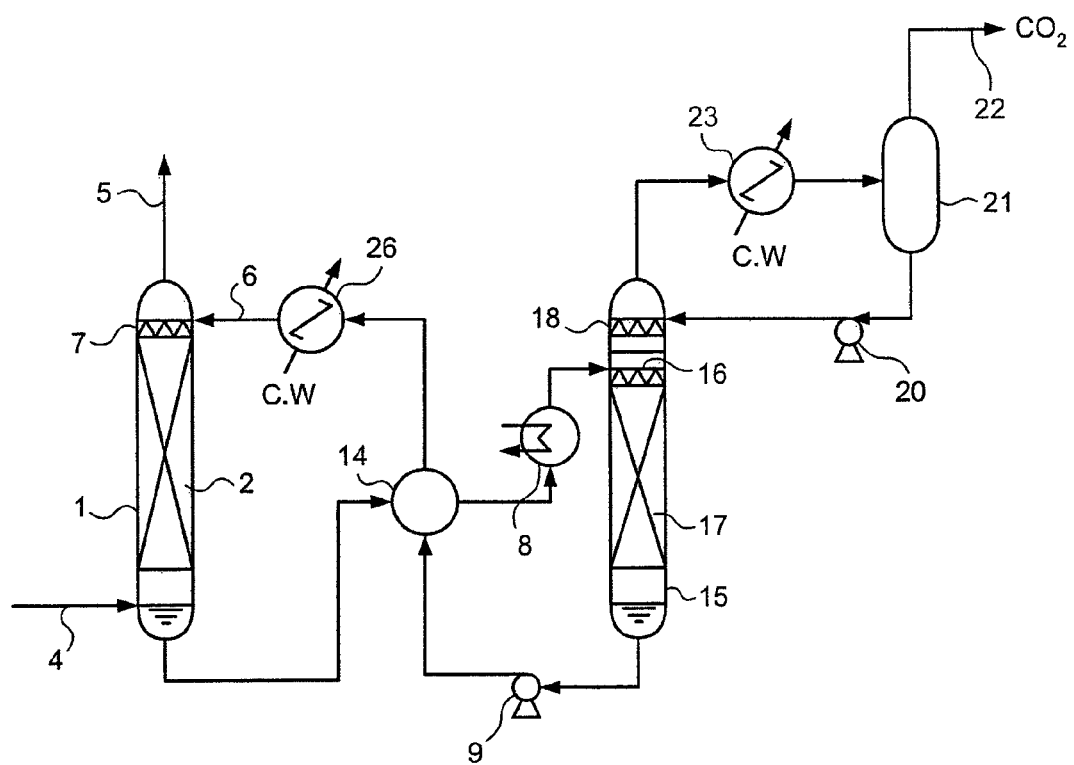

ABSORBENT LIQUID, AND APPARATUS AND METHOD FOR REMOVING $CO_2$ OR $H_2S$ FROM GAS WITH USE OF ABSORBENT LIQUID

CROSS REFERENCE TO RELATED APPLICATIONS

This application is a Divisional of application Ser. No. 12/308,086 filed on Dec. 5, 2008 now U.S. Pat. No. 8,231,719, which is a National Phase of PCT International Application No. PCT/JP2006/311769 filed on Jun. 12, 2006, and claims benefit to Patent Application No. JP2006-157584 filed in Japan, on Jun. 6, 2006. The entire contents of all of the above applications are hereby incorporated by reference.

TECHNICAL FIELD

The present invention relates to an absorbent liquid for removing $CO_2$ (carbon dioxide) or $H_2S$ (hydrogen sulfide) or both from gas, and an apparatus and a method for removing $CO_2$ or $H_2S$ or both with use of the absorbent liquid.

BACKGROUND ART

In recent years, as one of the causes of global warming, greenhouse effects caused by $CO_2$ are pointed out. From the viewpoint of protecting the earth environment, the problem of greenhouse effects needs to be rapidly solved worldwide. Sources of $CO_2$ are encompassed in any people's fields of activity where fossil fuel is burned, and there have been increasing demands for suppressing the discharge of $CO_2$. For meeting the demands, with respect to power generation plants which use a great amount of fossil fuel, such as thermal power stations, vigorous studies are made on a method in which combustion off-gas of a boiler is brought into contact with, for example, an aqueous solution of alkanolamine to remove and recover $CO_2$ from gas and a method in which the $CO_2$ recovered is stored without being released to the air. An aqueous solution of alkanolamine reacts with not only $CO_2$ (carbon dioxide) but also acidic gas, such as $H_2S$ (hydrogen sulfide). Therefore, in chemical industries, for the purpose of removing and recovering general acidic gases, the alkanolamine solution is widely used in refining processes for various gases.

Examples of alkanolamines include monoethanolamine (MEA), ethylaminoethanol (EAE), triethanolamine, N-methyldiethanolamine (MDEA), diisopropanolamine, and diglycolamine, and, generally, monoethanolamine (MEA) is preferably used.

Further, an effect of a mixture of a plurality of alkanolamines such that the mixture exhibits a performance which cannot be achieved by the individual alkanolamine is disclosed (for example, the performance of a mixture of MEA and AMP is disclosed. Patent Document 1). For improving the alkanolamine in an absorption performance, the use of a cyclic amine, such as piperazine, or a linear amine, such as ethylenediamine, as an absorption auxiliary agent has been proposed (Patent Document 2, Patent Document 3, Patent Document 4, and Patent Document 5).

Patent Document 1: Japanese Patent Application Laid-open No. H6-343858
Patent Document 2: Specification of U.S. Pat. No. 4,336,233
Patent Document 3: Japanese Patent Application Laid-open No. H1-231921
Patent Document 4: Japanese Patent Publication No. S61-19286
Patent Document 5: Specification of U.S. Pat. No. 6,436,174

DISCLOSURE OF INVENTION

Problem to be Solved by the Invention

In recovering a great amount of $CO_2$ in a large-scale plant, an apparatus which can recover $CO_2$ with energy as small as possible is desired. For achieving such an apparatus, an amount of the absorbent liquid circulated and an amount of heat required for desorption of the absorbed $CO_2$ must be reduced. For reducing the amount of the absorbent liquid circulated, it is necessary to increase the absorption capacity of the absorbent liquid per unit amount of the absorbent liquid, and hence the absorbent liquid frequently has an increased amine compound concentration.

However, with respect to the absorbent liquid having an increased amine compound concentration, problems have been pointed out in that the viscosity of the absorbent liquid is increased and in that the absorbent liquid exhibits corrosive properties (Patent Document 4). Among these, the problem of corrosive properties can be solved by the addition of a corrosion inhibitor to the absorbent liquid or appropriate selection of a material for piping, however, the problem of viscosity cannot be easily solved in the general process.

Further, a certain type of amine compound has a low solubility in a solvent so that it cannot be dissolved in an increased concentration. For example, piperazine described in Patent Document 3 has a low solubility in water, and further piperazine carbamate formed by the reaction of piperazine with $CO_2$ has a low solubility in the liquid. Therefore, piperazine can be added only in a limited concentration of 0.8 mol/l or less.

Patent Document 5 has a description showing that an absorbent liquid using a compound containing a nitrogen atom in a ring and having a branched hydroxyl group or a branched alkyl group in a wide range of concentration (0.1 to 50%) is useful, however, this absorbent liquid has a requirement that an alcohol be added to the absorbent liquid.

A known alkanolamine, such as MEA mentioned above, and water can be mixed in an arbitrary ratio and hence, generally, an aqueous solution of an alkanolamine having an increased concentration can be easily obtained. However, with respect to the aqueous solution containing a single type of a certain alkanolamine, the absorption capacity performance is not improved proportionally even when the amine concentration is increased. Accordingly, with respect to a certain type of amine, even when the amine concentration of the absorbent liquid is increased, there cannot be obtained an expected effect such that the amount of the absorbent liquid circulated is reduced. Therefore, for reducing the energy for $CO_2$ recovery, the development of an absorbent liquid, which is not increased in viscosity even when the nitrogen-containing compound concentration of the absorbent liquid is increased, and which has an absorption capacity performance and an absorption reaction heat performance dramatically improved, is desired.

In view of the above problems, a problem of the present invention is to provide an absorbent liquid which is advantageous not only in that, even when the nitrogen-containing compound concentration of the absorbent liquid is increased, the absorbent liquid is not increased in viscosity, but also in that both the absorption capacity performance and the absorption reaction heat performance are dramatically improved, and an apparatus and a method for removing $CO_2$ or $H_2S$ or both with use of the absorbent liquid.

Means for Solving Problem

An absorbent liquid for absorbing $CO_2$ or $H_2S$ or both from gas according to the present invention includes a first compound component; and a second compound component including a nitrogen-containing compound having in a molecule thereof at least two members selected from a primary nitrogen, a secondary nitrogen, and a tertiary nitrogen, or a nitrogen-containing compound having in a molecule thereof all of primary, secondary, and tertiary nitrogens, wherein the first compound component is any one of compounds represented by following formulae (I) to (III) or a mixture thereof:

[Chemical formula 1]

Nitrogen-containing compound (I)

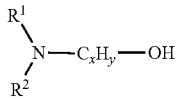

[Chemical formula 2]

Nitrogen-containing compound (II)

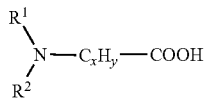

[Chemical formula 3]

Nitrogen-containing compound (III)

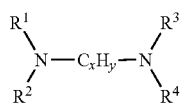

in the formulae (I) to (III): x and y respectively satisfy relationship: $1 \leq x \leq 5$ and $2 \leq y \leq 10$; and $R^1$, $R^2$, $R^3$, and $R^4$ represent —$C_iH_jO_kN_l$ (where i=0 to 10, j=1 to 21, k=0 to 5, and l=0 to 5).

In the absorbent liquid according to the present invention, the second compound component may be a nitrogen-containing compound having a secondary nitrogen in a ring or a nitrogen-containing compound having a tertiary nitrogen in a ring.

In the absorbent liquid according to the present invention, the second compound component may be a nitrogen-containing compound having secondary and tertiary nitrogens in a ring.

In the absorbent liquid according to the present invention, the second compound component may be a nitrogen-containing compound having a nitrogen in a substituent group branching from the ring.

In the absorbent liquid according to the present invention, the nitrogen-containing compound may be a nitrogen-containing compound having a primary nitrogen in a substituent group branching from the ring.

In the absorbent liquid according to the present invention, the second compound component may be a nitrogen-containing compound having three nitrogens or more in a molecule thereof.

In the absorbent liquid according to the present invention, the nitrogen-containing compound may be a nitrogen-containing compound having in a molecule thereof all of primary, secondary, and tertiary nitrogens.

In the absorbent liquid according to the present invention, the second compound component may be any one of nitrogen-containing compounds represented by following formulae (IV) to (XIII) or a mixture thereof:

[Chemical formula 4]

Nitrogen-containing compound (IV)

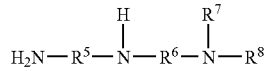

[Chemical formula 5]

Nitrogen-containing compound (V)

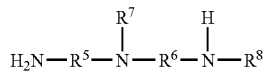

in the formulae (IV) to (V): $R^5$ and $R^6$ represent —$C_iH_jO_kN_l$ (where i=0 to 10, j=0 to 26, k=0 to 5, and l=0 to 5); and $R^7$ and $R^8$ represent —$C_iH_jO_kN_l$ (where i=1 to 10, j=0 to 26, k=0 to 5, and l=0 to 5),

[Chemical formula 6]

Nitrogen-containing compound (VI)

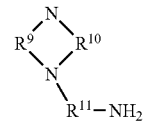

in the formula (VI): $R^9$ and $R^{11}$ represent —$C_iH_jO_kN_l$ (where i=0 to 10, j=0 to 26, k=0 to 5, and l=0 to 5); and $R^{10}$ represents —$C_iH_jO_kN_l$ (where i=1 to 10, j=0 to 26, k=0 to 5, and l=0 to 5),

[Chemical formula 7]

Nitrogen-containing compound (VI)

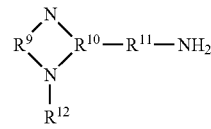

in the formula (VII): $R^9$ and $R^{11}$ represent —$C_iH_jO_kN_l$ (where i=0 to 10, j=0 to 26, k=0 to 5, and l=0 to 5); and $R^{10}$ and $R^{12}$ represent —$C_iH_jO_kN_l$ (where i=1 to 10, j=0 to 26, k=0 to 5, and l=0 to 5),

[Chemical formula 8]

Nitrogen-containing compound (VIII)

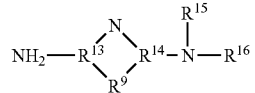

in the formula (VIII): $R^9$ represents —$C_iH_jO_kN_l$ (where i=0 to 10, j=0 to 26, k=0 to 5, and l=0 to 5); and $R^{13}$, $R^{14}$, $R^{15}$ and $R^{16}$ represent —$C_iH_jO_kN_l$ (where i=1 to 10, j=0 to 26, k=0 to 5, and l=0 to 5),

[Chemical formula 9]

Nitrogen-containing compound (IX)

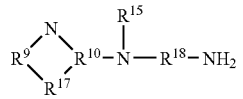

in the formula (IX): $R^9$ and $R^{18}$ represent —$C_iH_jO_kN_l$ (where i=0 to 10, j=0 to 26, k=0 to 5, and l=0 to 5); and $R^{10}$, $R^{15}$ and $R^{17}$ represent —$C_iH_jO_kN_l$ (where i=1 to 10, j=0 to 26, k=0 to 5, and l=0 to 5),

[Chemical formula 10]

Nitrogen-containing compound (X)

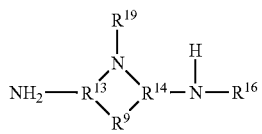

in the formula (X): $R^9$ represents —$C_iH_jO_kN_l$ (where i=0 to 10, j=0 to 26, k=0 to 5, and l=0 to 5); and $R^{13}$, $R^{14}$, $R^{16}$ and $R^{19}$ represent —$C_iH_jO_kN_l$ (where i=1 to 10, j=0 to 26, k=0 to 5, and l=0 to 5),

[Chemical formula 11]

Nitrogen-containing compound (XI)

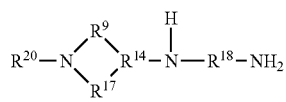

in the formula (XI): $R^9$ and $R^{18}$ represent —$C_iH_jO_kN_l$ (where i=0 to 10, j=0 to 26, k=0 to 5, and l=0 to 5); and $R^{14}$, $R^{17}$ and $R^{20}$ represent —$C_iH_jO_kN_l$ (where i=1 to 10, j=0 to 26, k=0 to 5, and l=0 to 5),

[Chemical formula 12]

Nitrogen-containing compound (XII)

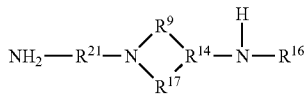

in the formula (XII): $R^9$ and $R^{21}$ represent —$C_iH_jO_kN_l$ (where i=0 to 10, j=0 to 26, k=0 to 5, and l=0 to 5); and $R^{14}$, $R^{16}$ and $R^{17}$ represent —$C_iH_jO_kN_l$ (where i=1 to 10, j=0 to 26, k=0 to 5, and l=0 to 5),

[Chemical formula 13]

Nitrogen-containing compound (XIII)

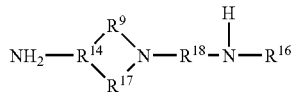

in the formula (XIII): $R^9$ and $R^{18}$ represent —$C_iH_jO_kN_l$ (where i=0 to 10, j=0 to 26, k=0 to 5, and l=0 to 5); and $R^{14}$, $R^{16}$ and $R^{17}$ represent —$C_iH_jO_kN_l$ (where i=1 to 10, j=0 to 26, k=0 to 5, and l=0 to 5).

In the absorbent liquid according to the present invention, the second compound component may be any one of nitrogen-containing compounds represented by following formulae (XIV) to (XIX) or a mixture thereof:

[Chemical formula 14]

Nitrogen-containing compound (XIV)

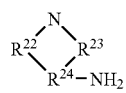

in the formula (XIV): $R^{22}$ represents —$C_iH_jO_kN_l$ (where i=0 to 10, j=0 to 26, k=0 to 5, and l=0 to 5); and $R^{23}$ and $R^{24}$ represent —$C_iH_jO_kN_l$ (where i=1 to 10, j=0 to 26, k=0 to 5, and l=0 to 5),

[Chemical formula 15]

Nitrogen-containing compound (XV)

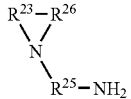

in the formula (XV): $R^{25}$ represents —$C_iH_jO_kN_l$ (where i=0 to 10, j=0 to 26, k=0 to 5, and l=0 to 5); and $R^{23}$ and $R^{26}$ represent —$C_iH_jO_kN_l$ (where i=1 to 10, j=0 to 26, k=0 to 5, and l=0 to 5),

[Chemical formula 16]

Nitrogen-containing compound (XVI)

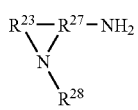

in the formula (XVI): $R^{23}$, $R^{27}$ and $R^{28}$ represent —$C_iH_jO_kN_l$ (where i=1 to 10, j=0 to 26, k=0 to 5, and l=0 to 5),

[Chemical formula 17]

Nitrogen-containing compound (XVII)

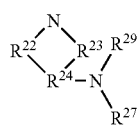

in the formula (XVII): $R^{22}$ represents —$C_iH_jO_kN_l$ (where i=0 to 10, j=0 to 26, k=0 to 5, and l=0 to 5); and $R^{23}$, $R^{24}$, $R^{27}$ and $R^{29}$ represent —$C_iH_jO_kN_l$ (where i=1 to 10, j=0 to 26, k=0 to 5, and l=0 to 5),

[Chemical formula 18]

Nitrogen-containing compound (XVIII)

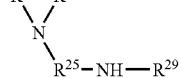

in the formula (XVIII): $R^{25}$ represents —$C_iH_jO_kN_l$ (where i=0 to 10, j=0 to 26, k=0 to 5, and l=0 to 5); and $R^{23}$, $R^{26}$ and $R^{29}$ represent —$C_iH_jO_kN_l$ (where i=1 to 10, j=0 to 26, k=0 to 5, and l=0 to 5),

[Chemical formula 19]

Nitrogen-containing compound (XIX)

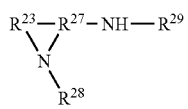

in the formula (XIX): $R^{23}$, $R^{27}$, $R^{28}$ and $R^{29}$ represent —$C_iH_jO_kN_l$ (where i=1 to 10, j=0 to 26, k=0 to 5, and l=0 to 5)

In the absorbent liquid according to the present invention, the second compound component may be a nitrogen-containing compound represented by following formula (XX):

[Chemical formula 20]

Nitrogen-containing compound (XX)

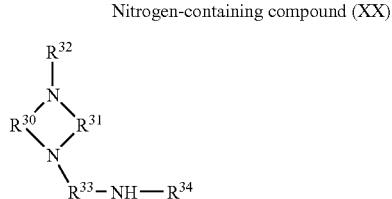

in the formula (XX): $R^{30}$, $R^{32}$, $R^{33}$ and $R^{34}$ represent —$C_iH_jO_kN_l$ (where i=1 to 10, j=0 to 26, k=0 to 5, and l=0 to 5), and $R^{31}$ represents —$C_iH_jO_kN_l$ (where i=0 to 10, j=0 to 26, k=0 to 5, and l=0 to 5).

In the absorbent liquid according to the present invention, the first compound component may be contained in an amount in a range from equal to or larger than 15 wt % to equal to or less than 45 wt % and the second compound component may be contained in an amount in a range from equal to or larger than 15 wt % to equal to or less than 45 wt %, and a total amount of the first compound component and the second compound component may be more than 30 wt % to equal to or less than 90 wt %.

In the absorbent liquid according to the present invention, the first compound component may be represented by the formula (I), where each of $R^1$ and $R^2$ is H.

In the absorbent liquid according to the present invention, the first compound component may be represented by the formula (I), where x is 2 to 4 and y is 4 to 8.

In the absorbent liquid according to the present invention, the first compound component may be represented by the formula (I), where $R^1$ is H and $R^2$ is —CmHnOoNp (where m=1 to 5, n=1 to 11, o=0 to 5, and p=0 to 5).

In the absorbent liquid according to the present invention, the first compound component may be represented by the formula (I), where x is 2 to 4, y is 4 to 8, and $R^2$ is $CH_3$, $C_2H_5$, $C_3H_7$, or $C_4H_9$.

In the absorbent liquid according to the present invention, the first compound component may be represented by the formula (I), where $R^1$ and $R^2$ represent —CmHnOoNp (where m=1 to 5, n=1 to 11, o=0 to 5, and p=0 to 5).

In the absorbent liquid according to the present invention, the first compound component may be represented by the formula (I), where x is 2, y is 4, $R^1$ is $CH_3$, and $R^2$ is $C_2H_4OH$.

An absorbent liquid for absorbing $CO_2$ or $H_2S$ or both from gas according to the present invention includes a cyclic amine compound having one nitrogen in a ring.

In the absorbent liquid according to the present invention, the cyclic amine having one nitrogen in a ring may be a cyclic amine having one nitrogen in a 5-membered ring, 6-membered ring, or 7-membered ring.

In the absorbent liquid according to the present invention, the cyclic amine having one nitrogen in a 5-membered ring, 6-membered ring, or 7-membered ring may be pyrrolidine (PR), piperidine (PZ), or hexamethyleneimine (HMI).

In the absorbent liquid according to the present invention, the cyclic amine compound having one nitrogen in a ring may be a nitrogen-containing compound having a primary nitrogen in a substituent group branching from the ring.

In the absorbent liquid according to the present invention, the nitrogen-containing compound having a primary nitrogen in a substituent group branching from the ring may be aminomethylpiperidine (AMPZ) or aminoethylpiperidine (AEPZ).

In the absorbent liquid according to the present invention, the cyclic amine compound having one nitrogen in a ring may be a nitrogen-containing compound having a hydroxyl group in a 5-membered ring, 6-membered ring, or 7-membered ring.

In the absorbent liquid according to the present invention, the nitrogen-containing compound having a hydroxyl group in a 5-membered ring, 6-membered ring, or 7-membered ring may be piperidinol (PDN).

An absorbent liquid includes a mixture of the absorbent liquid according to the present invention, and an alkanolamine.

In the absorbent liquid according to the present invention, the alkanolamine may be monoethanolamine (MEA), ethylaminoethanol (EAE), triethanolamine, N-methyldiethanolamine (MDEA), diisopropanolamine, diglycolamine, or a mixture thereof.

In the absorbent liquid according to the present invention, the cyclic amine may be contained in an amount in a range from equal to or larger than 5 wt % to equal to or less than 30 wt % and the alkanolamine may be contained in an amount in a range from equal to or larger than 15 wt % to equal to or less than 45 wt %, and a total amount of the cyclic amine and the alkanolamine may be more than 20 wt % to equal to or less than 90 wt %.

An apparatus for removing $CO_2$ or $H_2S$ or both according to the present invention includes an absorption tower that allows gas containing $CO_2$ or $H_2S$ or both and an absorbent liquid to be in contact with each other to remove $CO_2$ or $H_2S$ or both from the gas; and a regeneration tower that regenerates a solution which has absorbed the $CO_2$ or $H_2S$ or both, the absorption tower reusing the solution regenerated at the regeneration tower by removing the $CO_2$ or $H_2S$ or both from the solution, wherein the absorbent liquid includes a first compound component, and a second compound component including a nitrogen-containing compound having in a molecule thereof at least two members selected from a primary nitrogen, a secondary nitrogen, and a tertiary nitrogen, or a nitrogen-containing compound having in a molecule thereof all of primary, secondary, and tertiary nitrogens, the first compound component is any one of compounds represented by following formulae (I) to (III) or a mixture thereof:

[Chemical formula 1]

Nitrogen-containing compound (I)

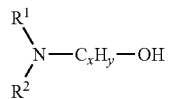

[Chemical formula 2]

Nitrogen-containing compound (II)

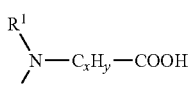

[Chemical formula 3]

Nitrogen-containing compound (III)

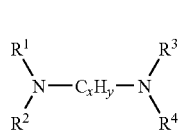

in the formulae (I) to (III): x and y respectively satisfy relationship: $1 \leq x \leq 5$ and $2 \leq y \leq 10$; and $R^1$, $R^2$, $R^3$, and $R^4$ represent —$C_iH_jO_kN_l$ (where i=0 to 10, j=1 to 21, k=0 to 5, and l=0 to 5).

A method for removing $CO_2$ or $H_2S$ or both implemented in an apparatus for removing $CO_2$ or $H_2S$ or both that provides an absorption tower and a regeneration tower, the method includes allowing gas containing $CO_2$ or $H_2S$ or both and an absorbent liquid to be in contact with each other in the absorption tower to remove $CO_2$ or $H_2S$ or both from the gas; and regenerating a solution which has absorbed the $CO_2$ or $H_2S$ or both in the regeneration tower, the absorption tower reusing the solution regenerated at the regeneration tower by removing the $CO_2$ or $H_2S$ or both from the solution, wherein the removal of the $CO_2$ or $H_2S$ or both is performed by using the absorbent liquid, the absorbent liquid including a first compound component, and a second compound component including a nitrogen-containing compound having in a molecule thereof at least two members selected from a primary nitrogen, a secondary nitrogen, and a tertiary nitrogen, or a nitrogen-containing compound having in a molecule thereof all of primary, secondary, and tertiary nitrogens, the first compound component is any one of compounds represented by following formulae (I) to (III) or a mixture thereof:

[Chemical formula 1]

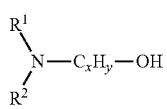

Nitrogen-containing compound (I)

[Chemical formula 2]

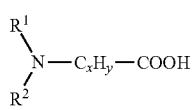

Nitrogen-containing compound (II)

[Chemical formula 3]

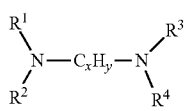

Nitrogen-containing compound (III)

in the formulae (I) to (III): x and y respectively satisfy relationship: $1 \leq x \leq 5$ and $2 \leq y \leq 10$; and $R^1$, $R^2$, $R^3$, and $R^4$ represent $-C_iH_jO_kN_l$ (where i=0 to 10, j=1 to 21, k=0 to 5, and l=0 to 5).

Effect of the Invention

According to the present invention, an absorbent liquid can be provided, the liquid including an alkanolamine as a first nitrogen-containing compound component for absorbing $CO_2$ or $H_2S$ or both from gas, and a second component containing a nitrogen-containing compound having in the molecule thereof two members or more selected from a primary nitrogen, a secondary nitrogen, and a tertiary nitrogen or a nitrogen-containing compound having in the molecule thereof all of primary, secondary, and tertiary nitrogens, and the absorbent liquid is advantageous not only in that the absorbent liquid is not increased in viscosity even when the nitrogen-containing compound concentration of the absorbent liquid is high, but also in that the absorbent liquid has an excellent $CO_2$ or $H_2S$ removal performance and an excellent absorption reaction heat performance, as compared to an aqueous solution containing solely an alkanolamine and a nitrogen-containing compound in the same concentration in terms of wt %.

Further, when an absorbent liquid having an amine concentration as high as 30 wt % or more is used, an absorbent liquid having an excellent absorption capacity performance and an excellent absorption reaction heat performance can be provided, as compared to an absorbent liquid using solely an amine in the same concentration. Therefore, an amount of the absorbent liquid circulated and an amount of heat required for desorption of the absorbed $CO_2$ or $H_2S$ or both can be reduced, as compared to those of an absorbent liquid using solely an amine. When the amount of the absorbent liquid circulated can be reduced, not only can the apparatus be compact, but also only a small amount of heat is required for the desorption, and further the reduction of heat of desorption enables recovery with smaller energy.

In the present invention, the absorbent liquid including a cyclic amine compound having one nitrogen in a ring has an excellent $CO_2$ or $H_2S$ removal performance, as compared to a known absorbent liquid including alkanolamine.

BRIEF DESCRIPTION OF DRAWING

FIG. 1 is a schematic diagram of an apparatus for removing $CO_2$.

EXPLANATIONS OF LETTERS OR NUMERALS

1 absorption tower
15 regeneration tower

BEST MODE(S) FOR CARRYING OUT THE INVENTION

Embodiments of the present invention will be explained below in detail with reference to the accompanying drawings. The invention is not limited to the embodiments. In addition, constituent elements in the embodiments and examples include those that can be easily assumed by those skilled in the art or that are substantially equivalent.

Embodiments of the Invention

A first absorbent liquid according to the present invention is an absorbent liquid for absorbing $CO_2$ or $H_2S$ or both from gas, where the absorbent liquid includes a first compound component, and a second compound component including a nitrogen-containing compound having in the molecule thereof at least two members selected from a primary nitrogen, a secondary nitrogen, and a tertiary nitrogen or a nitrogen-containing compound in the molecule thereof all of primary, secondary, and tertiary nitrogens.

The first compound component is any one of compounds represented by the following [Chemical formula 21] to [Chemical formula 23] or a mixture thereof:

[Chemical formula 21]

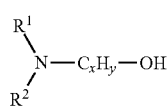

Nitrogen-containing compound (I)

[Chemical formula 22]

Nitrogen-containing compound (II)

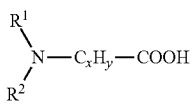

[Chemical formula 23]

Nitrogen-containing compound (III)

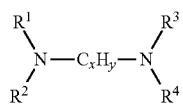

in the formulae (I) to (III): x and y respectively satisfy relationships: $1 \leq x \leq 5$ and $2 \leq y \leq 10$; and $R^1$, $R^2$, $R^3$, and $R^4$ represent —$C_iH_jO_kN_l$ (where i=0 to 10, j=1 to 21, k=0 to 5, and l=0 to 5).

Examples of compounds of the formula (I) used in the present invention include monoethanolamine (MEA), methyldiethanolamine (MDEA), diethanolamine (DEA), triethanolamine (TEA), diisopropanolamine (DIPA), 3-amino-1-propanol (AP), 2-amino-2-methylpropanol (AMP), ethyldiethanolamine (EDEA), 2-methylaminoethanol (MAE), 2-ethylaminoethanol (EAE), 2-n-propylaminoethanol, 2-n-butylaminoethanol (n-BAE), 2-n-pentylaminoethanol, 2-isopropylaminoethanol, 2-sec-butylaminoethanol, 2-isobutylaminoethanol (IBAE), 2-dimethylaminoethanol (DMAE), and 2-diethylaminoethanol (DEAE).

Examples of compounds of the formula (II) used in the present invention include 2,3-diaminopropionic acid (DAPA) and glycine.

Examples of compounds of the formula (III) used in the present invention include 1,2-ethylenediamine.

Two or more of these nitrogen-containing compounds can be used in combination.

In the present invention, with respect to the second compound component, there can be used any one of the following nitrogen-containing compounds: 1) a nitrogen-containing compound having a secondary or tertiary nitrogen in a ring; 2) a nitrogen-containing compound having secondary and tertiary nitrogens in a ring; 3) the nitrogen-containing compound of item 1) or 2) above, which has a nitrogen in a substituent group branching from the ring; 4) the nitrogen-containing compound of item 3) above, which has a primary nitrogen in a substituent group branching from the ring; 5) a nitrogen-containing compound having at least three nitrogens in the molecule thereof; and 6) the nitrogen-containing compound of item 5) above, which has in the molecule thereof at least nitrogens of different types.

While Examples of the nitrogen-containing compounds of items 1) to 6) above are shown in the formulae (IV) to (XX) below, the nitrogen-containing compounds in the present invention are not limited thereto.

The nitrogen-containing compounds represented by the formulae (IV) and (V) are individually a linear nitrogen-containing compound as shown in each formula and have all of primary, secondary, and tertiary nitrogens.

The nitrogen-containing compounds represented by the formulae (VI) to (XIII) are individually a cyclic nitrogen-containing compound and have all of primary, secondary, and tertiary nitrogens.

The nitrogen-containing compounds represented by the formulae (XIV) to (XIX) are individually a cyclic nitrogen-containing compound and have nitrogens at a cyclic portion and a branched portion, of which types are different from each other.

The nitrogen-containing compound represented by the formula (XX) is a cyclic nitrogen-containing compound, and contains at least three nitrogens and has in the molecule thereof at least nitrogens of different types.

Examples of compounds of the formula (IV) below used in the present invention include 4,7-diazo-2-amino-2-ethyl-7-methyloctane.

[Chemical formula 24]

Nitrogen-containing compound (IV)

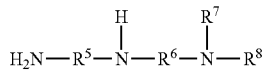

in the formula (IV): $R^5$ and $R^6$ represent —$C_iH_jO_kN_l$ (where i=0 to 10, j=0 to 26, k=0 to 5, and l=0 to 5); and $R^7$ and $R^8$ represent —$C_iH_jO_kN_l$ (where i=1 to 10, j=0 to 26, k=0 to 5, and l=0 to 5).

Examples of compounds of the formula (V) below used in the present invention include 4,7-diazo-2-amino-2,4-diethyloctane.

[Chemical formula 25]

Nitrogen-containing compound (V)

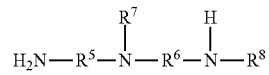

in the formula (V): $R^5$ and $R^6$ represent —$C_iH_jO_kN_l$ (where i=0 to 10, j=0 to 26, k=0 to 5, and l=0 to 5); and $R^7$ and $R^8$ represent —$C_iH_jO_kN_l$ (where i=1 to 10, j=0 to 26, k=0 to 5, and l=0 to 5).

Examples of compounds of the formula (VI) below used in the present invention include 1-(2-aminoethyl)piperazine (AEPRZ).

[Chemical formula 26]

Nitrogen-containing compound (VI)

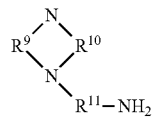

in the formula (VI): $R^9$ and $R^{11}$ represent —$C_iH_jO_kN_l$ (where i=0 to 10, j=0 to 26, k=0 to 5, and l=0 to 5); and $R^{10}$ represents —$C_iH_jO_kN_l$ (where i=1 to 10, j=0 to 26, k=0 to 5, and l=0 to 5).

Examples of compounds of the formula (VII) below used in the present invention include 1-methyl-2-aminomethylpiperazine.

[Chemical formula 27]

Nitrogen-containing compound (VII)

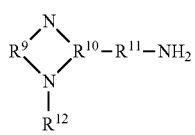

in the formula (VII): $R^9$ and $R^{11}$ represent —$C_iH_jO_kN_l$ (where i=0 to 10, j=0 to 26, k=0 to 5, and l=0 to 5); and $R^{10}$ and $R^{12}$ represent —$C_iH_jO_kN_l$ (where i=1 to 10, j=0 to 26, k=0 to 5, and l=0 to 5).

Examples of compounds of the formula (VIII) below used in the present invention include (2-amino)-(5-dimethylamino)pyrrolidine.

[Chemical formula 28]

Nitrogen-containing compound (VIII)

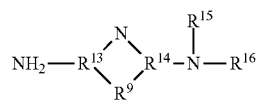

in the formula (VIII): $R^9$ represents $-C_iH_jO_kN_l$ (where i=0 to 10, j=0 to 26, k=0 to 5, and l=0 to 5); and $R^{13}$, $R^{14}$, $R^{15}$, and $R^{16}$ represent $-C_iH_jO_kN_l$ (where i=1 to 10, j=0 to 26, k=0 to 5, and l=0 to 5).

Examples of compounds of the formula (IX) below used in the present invention include 2-(aminoethyl(methylamino))pyrrolidine.

[Chemical formula 29]

Nitrogen-containing compound (IX)

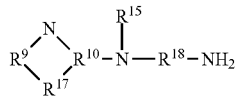

in the formula (IX): $R^9$ and $R^{18}$ represent $-C_iH_jO_kN_l$ (where i=0 to 10, j=0 to 26, k=0 to 5, and l=0 to 5); and $R^{10}$, $R^{15}$, and $R^{17}$ represent $-C_iH_jO_kN_l$ (where i=1 to 10, j=0 to 26, k=0 to 5, and l=0 to 5).

Examples of compounds of the formula (X) below used in the present invention include (1-methyl)(2-amino)-(5-methylamino)pyrrolidine.

[Chemical formula 30]

Nitrogen-containing compound (X)

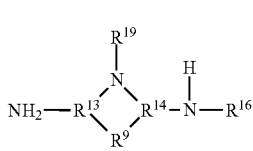

in the formula (X): $R^9$ represents $-C_iH_jO_kN_l$ (where i=0 to 10, j=0 to 26, k=0 to 5, and l=0 to 5); and $R^{13}$, $R^{14}$, $R^{16}$, and $R^{19}$ represent $-C_iH_jO_kN_l$ (where i=1 to 10, j=0 to 26, k=0 to 5, and l=0 to 5).

Examples of compounds of the formula (XI) below used in the present invention include (1-methyl)(2-aminoethylamino)pyrrolidine.

[Chemical formula 31]

Nitrogen-containing compound (XI)

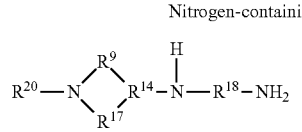

in the formula (XI): $R^9$ and $R^{18}$ represent $-C_iH_jO_kN_l$ (where i=0 to 10, j=0 to 26, k=0 to 5, and l=0 to 5); and $R^{14}$, $R^{17}$, and $R^{20}$ represent $-C_iH_jO_kN_l$ (where i=1 to 10, j=0 to 26, k=0 to 5, and l=0 to 5).

Examples of compounds of the formula (XII) below used in the present invention include (1-aminomethyl)(4-methylamino)piperidine.

[Chemical 32]

Nitrogen-containing compound (XII)

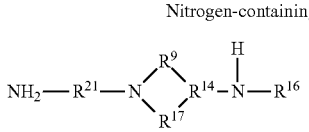

in the formula (XII): $R^9$ and $R^{21}$ represent $-C_iH_jO_kN_l$ (where i=0 to 10, j=0 to 26, k=0 to 5, and l=0 to 5); and $R^{14}$, $R^{16}$, and $R^{17}$ represent $-C_iH_jO_kN_l$ (where i=1 to 10, j=0 to 26, k=0 to 5, and l=0 to 5).

Examples of compounds of the formula (XIII) below used in the present invention include (1-methylaminoethyl)4-aminopiperidine.

[Chemical formula 33]

Nitrogen-containing compound (XIII)

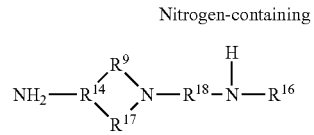

in the formula (XIII): $R^9$ and $R^{18}$ represent $-C_iH_jO_kN_l$ (where i=0 to 10, j=0 to 26, k=0 to 5, and l=0 to 5); and $R^{14}$, $R^{16}$, and $R^{17}$ represent $-C_iH_jO_kN_l$ (where i=1 to 10, j=0 to 26, k=0 to 5, and l=0 to 5).

Examples of compounds of the formula (XIV) below used in the present invention include 4-aminopiperidine.

[Chemical formula 34]

Nitrogen-containing compound (XIV)

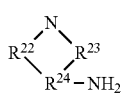

in the formula (XIV): $R^{22}$ represents $-C_iH_jO_kN_l$ (where i=0 to 10, j=0 to 26, k=0 to 5, and l=0 to 5); and $R^{23}$ and $R^{24}$ represent $-C_iH_jO_kN_l$ (where i=1 to 10, j=0 to 26, k=0 to 5, and l=0 to 5).

Examples of compounds of the formula (XV) below used in the present invention include (1-aminomethyl)piperidine.

[Chemical formula 35]

Nitrogen-containing compound (XV)

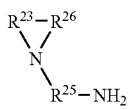

in the formula (XV): $R^{25}$ represents $-C_iH_jO_kN_l$ (where i=0 to 10, j=0 to 26, k=0 to 5, and l=0 to 5); and $R^{23}$ and $R^{26}$ represent $-C_iH_jO_kN_l$ (where i=1 to 10, j=0 to 26, k=0 to 5, and l=0 to 5).

Examples of compounds of the formula (XVI) below used in the present invention include N-methyl-2-aminopiperidine.

[Chemical formula 36]

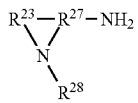

Nitrogen-containing compound (XVI)

in the formula (XVI): $R^{23}$, $R^{27}$, and $R^{28}$ represent —$C_iH_jO_kN_l$ (where i=1 to 10, j=0 to 26, k=0 to 5, and l=0 to 5).

Examples of compounds of the formula (XVII) below used in the present invention include N,N-dialkyl-4-aminopiperidine.

[Chemical formula 37]

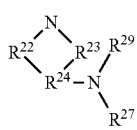

Nitrogen-containing compound (XVII)

in the formula (XVII): $R^{22}$ represents —$C_iH_jO_kN_l$ (where i=0 to 10, j=0 to 26, k=0 to 5, and l=0 to 5); and $R^{23}$, $R^{24}$, $R^{27}$, and $R^{29}$ represent —$C_iH_jO_kN_l$ (where i=1 to 10, j=0 to 26, k=0 to 5, and l=0 to 5).

Examples of compounds of the formula (XVIII) below used in the present invention include (N-alkylaminomethyl)piperidine.

[Chemical formula 38]

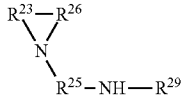

Nitrogen-containing compound (XVIII)

in the formula (XVIII): $R^{25}$ represents —$C_iH_jO_kN_l$ (where i=0 to 10, j=0 to 26, k=0 to 5, and l=0 to 5); and $R^{23}$, $R^{26}$, and $R^{29}$ represent —$C_iH_jO_kN_l$ (where i=1 to 10, j=0 to 26, k=0 to 5, and l=0 to 5).

Examples of compounds of the formula (XIX) below used in the present invention include (N-alkyl-4-aminoalkyl)piperidine.

[Chemical formula 39]

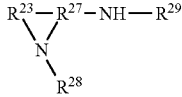

Nitrogen-containing compound (XIX)

in the formula (XIX): $R^{23}$, $R^{27}$, $R^{28}$, and $R^{29}$ represent —$C_iH_jO_kN_l$ (where i=1 to 10, j=0 to 26, k=0 to 5, and l=0 to 5).

Examples of compounds of the formula (XX) below used in the present invention include (1-methyl-aminoethyl)(4-methyl)piperazine.

[Chemical formula 40]

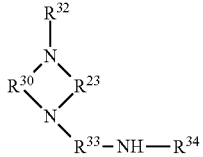

Nitrogen-containing compound (XX)

in the formula (XX): $R^{30}$, $R^{32}$, $R^{33}$, and $R^{34}$ represent —$C_iH_jO_kN_l$ (where i=0 to 10, j=0 to 26, k=0 to 5, and l=0 to 5); and $R^{31}$ represents —$C_iH_jO_kN_l$ (where i=1 to 10, j=0 to 26, k=0 to 5, and l=0 to 5).

With respect to the concentration of the amine component in the first absorbent liquid of the present invention to be brought into contact with gas, it is preferred that the first compound component is contained in an amount in a range from equal to or larger than 15 wt % to equal to or less than 45 wt % and the second compound component is contained in an amount in a range from equal to or larger than 15 wt % to equal to or less than 45 wt %, where the total amount of the first compound component and the second compound component is more than 30 wt % to equal to or less than 90 wt %. The total amount is more preferably in a range of from 40 wt % to 70 wt %.

When the amine component concentration falls outside of the above range, as shown in Examples below, the absorbent liquid is inevitably increased in viscosity. In addition, such a concentration makes no contribution to dramatic improvement of the absorption capacity performance or the absorption reaction heat performance.

With respect to the component other than the amine, water is generally used, however, other solvents and a mixture thereof can be also used. Further, a corrosion inhibitor, a deterioration preventing agent, or the like is optionally added.

In the present invention, the temperature of the first absorbent liquid being in contact with gas is generally in a range of from 30° C. to 70° C.

With respect to the conditions for gas usable in the present invention, representative conditions are such that a total pressure is approximately atmospheric pressure and a $CO_2$ concentration is 10%, however, the conditions are not limited thereto.

Examples of gases to be treated by the present invention include coal gas, synthetic gas, coke oven gas, petroleum gas, and natural gas, however, the gas is not limited thereto, and any gas can be used as long as the gas contains acidic gas, such as $CO_2$ or $H_2S$.

With respect to the process which can be employed in the method for removing $CO_2$ or $H_2S$ or both from gas in the present invention, there is no particular limitation, and an example of an apparatus for removing $CO_2$ is described below with reference to FIG. 1.

FIG. 1 is a schematic diagram of an apparatus for removing $CO_2$. As shown in FIG. 1, gas is led to an absorption tower 1 through a $CO_2$-containing gas-feed inlet 4. In a packed portion 2, the gas placed in the absorption tower 1 is brought into contact in a counter flow with a $CO_2$ absorbent liquid fed from a nozzle 7, and $CO_2$ is absorbed and removed from the gas by the absorbent liquid, and the resultant gas is discharged through a $CO_2$-removed gas-discharge outlet 5. The absorbent liquid fed to the absorption tower 1 absorbs $CO_2$, and is led to a heat exchanger 14 and a heater 8 and heated and led to a regeneration tower 15. In the regeneration tower 15, the absorbent liquid flows through a nozzle 16 and a packed portion 17 toward the lower portion of the tower. During this time, $CO_2$ is removed to regenerate the absorbent liquid. The regenerated absorbent liquid is led by a pump 9 to the heat exchanger 14 and an absorbent liquid cooler 26 and fed back to the absorption tower 1 through an absorbent liquid feed inlet 6.

On the other hand, in the upper portion of the regeneration tower 15, the $CO_2$ removed from the absorbent liquid is brought into contact with a reflux water fed from the nozzle 18, and cooled by a regeneration tower reflux condenser 23, and, in a reflux drum 21, the $CO_2$ is separated from the reflux water formed by condensing water vapor accompanying the $CO_2$, and led to a $CO_2$ recovery step through a recovered $CO_2$ line 22. The reflux water is fed by a reflux water pump 20 to the regeneration tower 15. The present embodiment briefly describes an overview of the apparatus, and descriptions of some parts of peripheral instruments will be omitted.

By using the first absorbent liquid of the present invention as an absorbent liquid for the above-described apparatus for removing $CO_2$, efficient absorption and removal of $CO_2$ can be achieved.

With respect to the second absorbent liquid of the present invention, the absorbent liquid can include: the first absorbent liquid which includes a first compound component, and a second compound component including a nitrogen-containing compound having in the molecule thereof at least two members selected from a primary nitrogen, a secondary nitrogen, and a tertiary nitrogen or a nitrogen-containing compound having in the molecule thereof all of primary, secondary, and tertiary nitrogens; and a cyclic amine compound having one nitrogen in a ring.

It is preferred that the cyclic amine having one nitrogen in a ring is a cyclic amine having one nitrogen in a 5-membered ring, 6-membered ring, or 7-membered ring.

Examples of the cyclic amines having one nitrogen in a 5-membered ring, 6-membered ring, or 7-membered ring include pyrrolidine (PR) represented by [Chemical formula 41] below, piperidine (PZ) represented by [Chemical formula 42] below, and hexamethyleneimine (HMI).

[Chemical formula 41]

[Chemical formula 42]

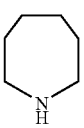

[Chemical formula 43]

It is preferred that the cyclic amine compound having one nitrogen in a ring is a nitrogen-containing compound having a primary nitrogen in a substituent group branching from the ring.

Examples of the nitrogen-containing compounds having a primary nitrogen in a substituent group branching from the ring include nitrogen-containing compounds having an aminomethyl group or aminoethyl group in a 5-membered ring, 6-membered ring, or 7-membered ring, represented by [Chemical formula 44] to [Chemical formula 49] below.

Particularly, aminomethylpiperidine (4-(aminomethyl)-piperidine: AMPZ) represented by [Chemical formula 46] below or aminoethylpiperidine (4-(aminoethyl)-piperidine: AEPZ) represented by [Chemical formula 47] below is preferably used, because they exhibit excellent $CO_2$ absorption rate.

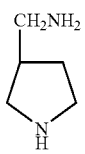

[Chemical formula 44]

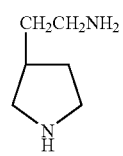

[Chemical formula 45]

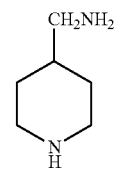

[Chemical formula 46]

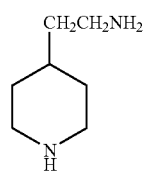

[Chemical formula 47]

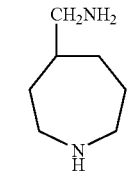

[Chemical formula 48]

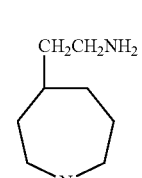

[Chemical formula 49]

Further, it is preferred that the cyclic amine compound having one nitrogen in a ring is a nitrogen-containing compound having a hydroxyl group in a 5-membered ring, 6-membered ring, or 7-membered ring.

Examples of the nitrogen-containing compounds having a hydroxyl group in a 5-membered ring, 6-membered ring, or 7-membered ring include nitrogen-containing compounds represented by [Chemical formula 50] to [Chemical formula 52] below. Particularly, 4-piperidinol (PDN) represented by [Chemical formula 51] is preferably used, because it exhibits excellent $CO_2$ absorption rate.

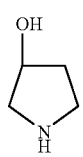

[Chemical formula 50]

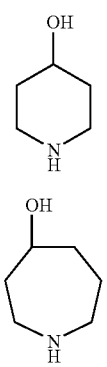

[Chemical formula 51]

[Chemical formula 52]

In the second absorbent liquid of the present invention, a cyclic amine or a mixture thereof can be used, and the absorbent liquid includes a mixture of the absorbent liquid including any one of the above cyclic amines and an alkanolamine which is the above-described first compound component.

Particularly, examples of the alkanolamines include monoethanolamine (MEA), ethylaminoethanol (EAE), triethanolamine, N-methyldiethanolamine (MDEA), diisopropanolamine, and diglycolamine, and, generally, examples include a monoethanolamine (MEA) and a mixture thereof.

With respect to the concentration of the amine component in the absorbent liquid of the present invention to be brought into contact with gas, it is preferred that the cyclic amine is contained in an amount in a range from equal to or larger than 5 wt % to equal to or less than 30 wt % and the alkanolamine is contained in an amount in a range from equal to or larger than 15 wt % to equal to or less than 45 wt %, where the total amount of the cyclic amine and the alkanolamine is more than 20 wt % to equal to or less than 90 wt %.

When the amine component concentration falls outside the above range, the absorbent liquid is inevitably increased in viscosity. In addition, such a concentration makes no contribution to dramatic improvement of the absorption capacity performance or the absorption reaction heat performance.

Meanwhile, with respect to the component other than the amine, water is generally used, however, solvents other than water and a mixture thereof can be also used. Further, a corrosion inhibitor, a deterioration preventing agent, or the like is optionally added.

In the present invention, the temperature of the absorbent liquid being in contact with gas is generally in a range of from 30° C. to 70° C.

With respect to the conditions for gas usable in the present invention, representative conditions are such that the total pressure is approximately atmospheric pressure and the $CO_2$ concentration is 10%, however, the conditions are not limited thereto.

Like the first absorbent liquid, by using the second absorbent liquid of the present invention as an absorbent liquid for the above-described apparatus for removing $CO_2$ shown in FIG. 1, efficient absorption and removal of $CO_2$ can be achieved.

EXAMPLES

The present invention will be explained below in more detail with reference to Examples.

Examples 1 to 3 and Comparative Examples 1-1 to 4-2

In each of reaction vessels made of glass on the sample side and on the reference side of an apparatus for measuring heat of reaction (Calvet calorimeter), an aqueous solution containing monoethanolamine (MEA) having a primary amino group in an amount of 30 wt % as a first compound component and an aqueous solution containing 1-(2-aminoethyl)piperazine (AEPRZ) having primary, secondary, and tertiary amino groups in an amount of 30 wt % as a second compound component were mixed together to form an absorbent liquid (Example 1).

Further, an aqueous solution containing 2-ethylaminoethanol (EAE) having a secondary amino group in an amount of 30 wt % as a first compound component and an aqueous solution containing 1-(2-aminoethyl)piperazine (AEPRZ) in an amount of 30 wt % as a second compound component were mixed together to form an absorbent liquid (Example 2).

Further, an aqueous solution containing methyldiethanolamine (MDEA) having a tertiary amino group in an amount of 30 wt % as a first compound component and an aqueous solution containing 1-(2-aminoethyl)piperazine (AEPRZ) in an amount of 30 wt % as a second compound component were mixed together to form an absorbent liquid (Example 3).

5 grams of each of the absorbent liquids in Examples 1 to 3 was placed in the vessel, and a temperature of a thermostatic chamber was adjusted to 40° C. While maintaining the temperature at 40° C., test gases were individually brought by bubbling into contact with the respective absorbent liquids on the sample side and on the reference side under atmospheric pressure at a flow rate of 50 ml/min.

With respect to the test gases, a model gas at 40° C. having a composition of $CO_2$: 10 mol %; $N_2$: 90 mol % was used for the sample side, and a gas at 40° C. having a composition of $N_2$: 100 mol % was used for the reference side.

The test gases were continuously allowed to flow, and time derivative values (W) of the amounts of heat generated on the sample side and on the reference side were individually measured, and, from a change with time of a difference between these values (heat flow), a calorific value (kJ) caused due to the $CO_2$ absorption reaction was determined by making a calculation. A point in time when the heat flow value was lowered to 2% of the peak value or less was judged to be a completion (saturation) point of the $CO_2$ absorption reaction, and a period of time from the start of the gas flowing to the completion of the reaction was used as a reaction time (minute). $CO_2$ contained in the $CO_2$ absorbent liquid after completion of the reaction was measured using a $CO_2$ analyzer (total organic carbon analyzer), and a $CO_2$ saturation absorption (mol $CO_2$/kg absorbent liquid) of the absorbent liquid was determined by making a calculation.

From the calorific value, reaction time, and $CO_2$ saturation absorption until completion of the reaction, a $CO_2$ absorption reaction rate (mol $CO_2$/min) and a $CO_2$ absorption reaction heat (kJ/mol $CO_2$) were determined by making a calculation.

In addition to the mixtures of a plurality of amines, with respect to 30 wt % or 60 wt % aqueous solutions of MEA, EAE, MDEA, or AEPRZ as Comparative Examples, similar tests were conducted.

The results of the $CO_2$ saturation absorption amount, $CO_2$ absorption reaction rate, and $CO_2$ absorption reaction heat in the Examples and Comparative Examples are shown in Table 1 below.

TABLE 1

|  | Type and concentration of amine | $CO_2$ Saturation absorption amount [mol $CO_2$/kg absorbent liquid] | $CO_2$ Absorption reaction rate [×$10^{-5}$ mol $CO_2$/min] | $CO_2$ Absorption reaction heat [kJ/mol $CO_2$] |
|---|---|---|---|---|
| Example 1 | MEA 30 wt. % + AEPRZ 30 wt. % | 4.7 | 8.8 | 77.8 |
| Example 2 | EAE 30 wt. % + AEPRZ 30 wt. % | 4.1 | 11.3 | 73.5 |
| Example 3 | MDEA 30 wt. % + AEPRZ 30 wt. % | 3.8 | 7.6 | 55.1 |
| Comparative Example 1-1 | MEA 30 wt. % | 2.6 | 10.1 | 77.7 |
| Comparative Example 1-2 | MEA 60 wt. % | 4.7 | 9.3 | 83.6 |
| Comparative Example 2-1 | EAE 30 wt. % | 2.2 | 6.2 | 69.7 |
| Comparative Example 2-2 | EAE 60 wt. % | 3.3 | 7.4 | 82.2 |
| Comparative Example 3-1 | MDEA 30 wt. % | 1.1 | 0.9 | 26.6 |
| Comparative Example 3-2 | MDEA 60 wt. % | 0.3 | 0.3 | 96.1 |
| Comparative Example 4-1 | AEPRZ 30 wt. % | 2.4 | 10.0 | 67.7 |
| Comparative Example 4-2 | AEPRZ 60 wt. % | 3.5 | 11.7 | 79.3 |

As can be seen from Table 1, when the 30 wt % absorbent liquids (Comparative Examples 1-1, 2-1, 3-1, and 4-1) and 60 wt % absorbent liquids (Comparative Examples 1-2, 2-2, 3-2, and 4-2) comprised of MEA, EAE, MDEA, or AEPRZ are compared with each other in respect of the performance, the $CO_2$ saturation absorption amount performance and the $CO_2$ reaction heat performance are not proportional to the amine concentration. From this, it is apparent that, with respect to the aqueous solution containing a single type of amine, the increase of the amine concentration of the aqueous solution cannot be expected to satisfactorily improve the performance.

In contrast, it has been found that the mixed absorbent liquid of MEA and AEPRZ (Example 1), the mixed absorbent liquid of EAE and AEPRZ (Example 2), and the absorbent liquid of MDEA and AEPRZ (Example 3) individually have both an excellent $CO_2$ absorption capacity performance and a $CO_2$ absorption reaction heat performance, as compared to the aqueous solutions each containing solely an alkanolamine or amine compound (Comparative Examples 1-2, 2-2, 3-2, and 4-2) in the same concentration in terms of wt %.

For example, with respect to the absorbent liquid in Example 2 including EAE 30% by weight+AEPRZ 30% by weight, the $CO_2$ absorption capacity was increased by 20% and the $CO_2$ absorption reaction heat was reduced by 10%, as compared to those of the absorbent liquid in Comparative Example 2-2 including EAE 60 wt %, which is one of the constituents of the absorbent liquid in Example 2, and the $CO_2$ absorption capacity was increased by 15% and the $CO_2$ absorption reaction heat was reduced by 7%, as compared to those of the absorbent liquid in Comparative Example 4-2 including AEPRZ 60 wt %, which is one of the constituents of the absorbent liquid in Example 2. From this, it is found that the performance is remarkably improved by the effect of mixing.

The energy required for the recovery of $CO_2$ is largely determined by a factor contributing to the $CO_2$ absorption capacity performance and a factor contributing to the $CO_2$ absorption reaction heat performance. Therefore, the improvement of the above performance by the present invention enables a great saving of energy.

Examples 5 to 10 and Comparative Examples 5 and 6

Using absorbent liquids (Examples 5 to 9) each including solely a cyclic amine of pyrrolidine (PR) represented by the [Chemical formula 41] above (Example 5), piperidine (PZ) represented by the [Chemical formula 42] above (Example 6), 4-(aminomethyl)-piperidine (AMPZ) represented by the [Chemical formula 46] above (Example 7), hexamethyleneimine (HMI) represented by the [Chemical formula 43] above (Example 8), or 4-piperidinol (PDN) represented by the [Chemical formula 51] above (Example 9), and an absorbent liquid (Example 10) including a mixture (50:3) of EAE and AMPZ as secondary amines, an absorption rate and an absorption rate ratio were determined.

As Comparative Examples, using as an alkanolamine monoethanolamine (MEA) which is primary (Comparative Example 6) and ethylaminoethanol (EAE) which is secondary (Comparative Example 5), similar evaluations were made.

An absorption rate ratio was determined using MEA in Comparative Example 6 as a reference.

The results are shown in Table 2 below. In Table 2 below, an amine concentration, a $CO_2$ partial pressure, $CO_2$ absorption rate, and an absorption rate ratio are shown.

TABLE 2

|  |  | Amine concentration mol/L | $CO_2$ Partial pressure kPa | $CO_2$ Absorption rate (kmol/s · $m^2$) × $10^6$ | Absorption rate ratio |
|---|---|---|---|---|---|
| Example 5 | PR | 1.4 | 1.0 | 2.5 | 2.6 |
| Example 6 | PZ | 1.4 | 1.0 | 1.9 | 1.9 |
| Example 7 | AMPZ | 1.4 | 1.0 | 1.8 | 1.9 |
| Example 8 | HMI | 1.4 | 1.0 | 1.8 | 1.8 |
| Example 9 | PDN | 1.4 | 1.0 | 1.6 | 1.6 |
| Example 10 | EAE + AMPZ | 1.4 | 1.0 | 1.2 | 1.2 |
| Comparative Example 5 | EAE | 1.4 | 1.0 | 1.1 | 1.1 |
| Comparative Example 6 | MEA | 1.4 | 1.0 | 0.98 | 1.0 |

As can be seen from Table 2, each of the absorbent liquids in Examples 5 to 10 has more excellent absorption rate than those of MEA and EAE in the Comparative Examples.

Examples 11 and 12 and Comparative Example 7

Among the above amines, using AMPZ (Example 11) or PDN (Example 12), gas-liquid equilibrium was measured. As a Comparative Example, a similar evaluation was made using MEA (Comparative Example 7).

Conditions for measurement are as follows. Absorption conditions were such that, at the bottom of the absorption tower, the temperature was 40° C. and the $CO_2$ partial pressure was 9.8 kPa. On the other hand, regeneration conditions were such that, at the bottom of the regeneration tower, the temperature was 120° C. and the $CO_2$ partial pressure was 9.8 kPa.

The results are shown in Table 3 below.

TABLE 3

| | | Amine concentration mol/L | $CO_2$ Loading molCO$_2$/mol amine | | $CO_2$ Loading difference (molCO$_2$/ mol amine) |
|---|---|---|---|---|---|
| | | | Absorption condition*1 | Absorption condition*2 | |
| Example 11 | AMPZ | 1.0 | 1.15 | 0.65 | 0.5 |
| Example 12 | PDN | 1.0 | 0.74 | 0.27 | 0.47 |
| Comparative Example 7 | MEA | 1.0 | 0.61 | 0.2 | 0.4 |

*1Absorption conditions: At bottom of absorption tower, temperature: 40° C.; $CO_2$ partial pressure: 9.8 kPa
*2Regeneration conditions: At bottom of regeneration tower, temperature: 120° C.; $CO_2$ partial pressure: 9.8 kPa As can be seen from Table 3, in the gas-liquid equilibrium, AMPZ and PEN are individually more excellent in the $CO_2$ loading than MEA (Comparative Example 7), which confirms that they achieve excellent absorption and regeneration of $CO_2$.

INDUSTRIAL APPLICABILITY

As described above, the absorbent liquid of the present invention achieves both the reduction of the amount of the absorbent liquid circulated and the reduction of the amount of heat required for dissociation of the absorbed $CO_2$, and therefore is advantageously used in removal and recovery of $CO_2$ (carbon dioxide) or $H_2S$ (hydrogen sulfide) from gas discharged from plant facilities including various boilers.

The invention claimed is:

1. An absorbent liquid for absorbing CO2 or H2S or both from gas, the absorbent liquid comprising a mixture of a cyclic amine compound having one nitrogen in a ring, wherein the cyclic amine compound is hexamethyleneimine or aminomethylpiperidine and an alkanolamine, wherein the alkanolamine is monoethanolamine, ethylaminoethanol, triethanolamine, N-methyldiethanolamine, diisopropanolamine, diglycolamine, or a mixture thereof.

2. The absorbent liquid according to claim 1, wherein
   the cyclic amine is contained in an amount in a range from equal to or larger than 5 weight-% to equal to or less than 30 weight-%, and
   the alkanolamine is contained in an amount in a range from equal to or larger than 15 weight-% to equal to or less than 45 weight-% and
   a total amount of the cyclic amine and the alkanolamine is more than 20 weight-% to equal to or less than 90 weight-%.

3. An apparatus for removing CO2 or H2S or both, comprising:
   an absorption tower that allows gas containing CO2 or H2S or both and an absorbent liquid to be in contact with each other to remove CO2 or H2S or both from the gas; and
   a regeneration tower that regenerates a solution which has absorbed the CO2 or H2S or both, the absorption tower reusing the solution regenerated at the regeneration tower by removing the CO2 or H2 S or both from the solution,
   wherein the absorbent liquid according to any one of claims 1 and 2 is used.

4. A method for removing CO2 or H2S or both implemented in an apparatus for removing CO2 or H2S or both that provides an absorption tower and a regeneration tower, the method comprising:
   allowing gas containing CO2 or H2S or both and an absorbent liquid to be in contact with each other in the absorption tower to remove CO2 or H2S or both from the gas; and
   regenerating a solution which has absorbed the CO2 or H2S or both in the regeneration tower, the absorption tower reusing the solution regenerated at the regeneration tower by removing the CO2 or H2S or both from the solution,
   wherein the removal of the CO2 or H2S or both is performed by using the absorbent liquid according to any one of claims 1 and 2.

* * * * *